T. E. GRIMES.
Saw-Sets.
No. 143,447.
Patented Oct. 7, 1873.
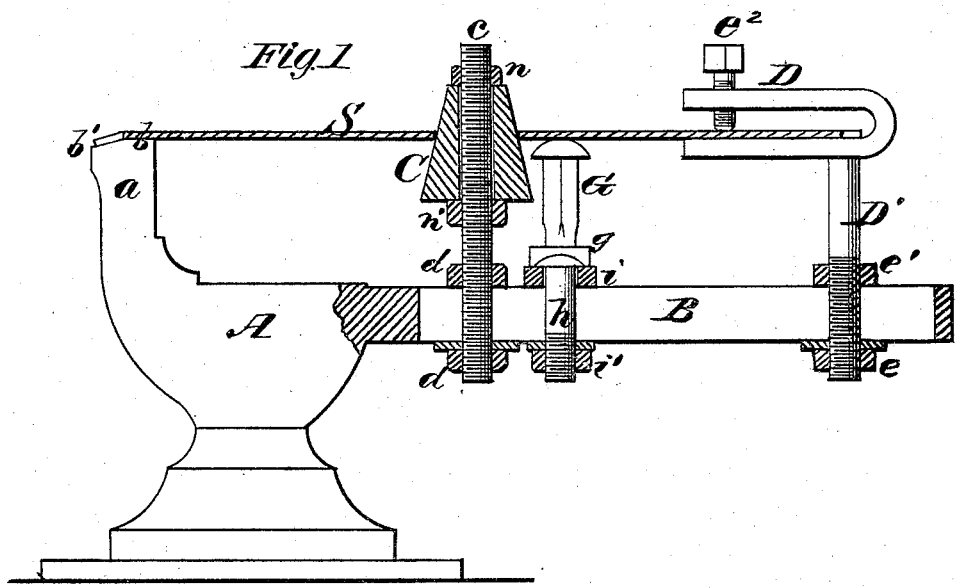
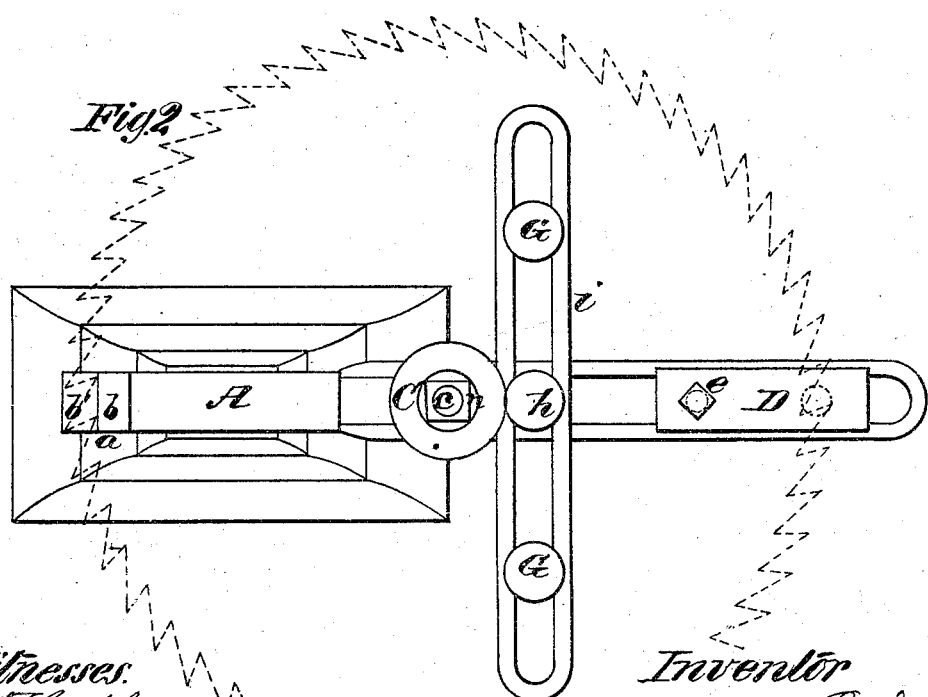
Witnesses.
R. T. Campbell
J. N. Campbell
Inventor
Thos. E. Grimes
by
Munn, Fenwick & Lawrence

UNITED STATES PATENT OFFICE.

THOMAS E. GRIMES, OF FREMONT, OHIO.

IMPROVEMENT IN SAW-SETS.

Specification forming part of Letters Patent No. 143,447, dated October 7, 1873; application filed February 27, 1873.

*To all whom it may concern:*

Be it known that I, THOMAS E. GRIMES, of Fremont, in the county of Sandusky and State of Ohio, have invented a new and improved Machine for Setting or Righting Saws; and I do hereby declare that the following is a full, clear, and exact description thereof, reference being had to the accompanying drawings making part of this specification, in which—

Figure 1 is a sectional view of the improved machine, showing a circular saw adjusted in position for setting its teeth. Fig. 2 is a top view of the machine, showing a circular saw adjusted thereon.

Similar letters of reference indicate corresponding parts in the several figures.

This invention relates to machines for setting saw-teeth accurately; and has for its object the adaptability of the machine to saws of different sizes, by the employment of a vertically-adjustable centering-cone, in combination with adjustable auxiliary supports for different saws, as will be hereinafter explained.

The following description of my invention will enable others skilled in the art to understand it.

In the accompanying drawings, A represents the standard of the machine, the base of which may be secured down to an established object in any suitable manner. This standard has rising from it a portion, $a$, on which is formed horizontal and inclined anvil-faces $b$ $b'$, the inclined portion, $b'$, of which is at the required angle with respect to the horizontal portion, $b$, to give the set to the saw-teeth. To the standard A is permanently secured a vertically-slotted horizontal arm, B, through which passes vertically a screw-threaded post, $c$, that is adjustably secured to the slotted arm B by means of nuts $d$ $d$. By loosening the nuts $d$ $d$ the post $c$ can be moved nearer to, or farther from, the anvil portion $a$ for saws of different diameters. On the post $c$ is applied a conical frustum, C, which can be adjusted vertically by means of two nuts, $n$ $n'$—one above it, and the other below it—and secured at any desired height above the arm B. D represents a horizontal V-shaped rest, which is secured upon the upper end of a vertical post, D', which post passes through the slotted arm, and is adjustably secured to it by means of nuts $e$ $e^1$. This rest D is provided with a screw, $e^2$, which affords an upward bearing for the saw when adjusted in position for setting. Between the posts $c$ D' are two saw-supports, G G, which present convex upper surfaces, and are secured to a horizontal slotted bar, $i$, on opposite sides of the arm B, by means of nuts $g$. The slotted bar $i$ lies transversely across the arm B; and is secured, at the middle of its length, to this arm by means of a bolt, $h$, and nut $i'$, as shown in Fig. 1.

It will be seen from the above description that, when a saw is adjusted in the machine, it has five points of support, to wit: The anvil-face $b$, the conical frustum C, the two lateral rests G G, and the screw $e^2$. The diameter of a saw to be set being known, the conical frustum is adjusted at the proper distance from the anvil $b'$, and then adjusted up or down until its axis will exactly coincide with the axis of the saw when the edge surrounding the eye of the latter rests upon the cone. The rests G G and the screw $e^2$ are then adjusted up or down, as the case may require, until they impinge against the saw.

The rests G G are adjustable laterally, so that they can be set at any required distance apart, according to the diameter of the saw to be set. The rest D, with its screw $e^2$, can be adjusted and set at any required distance from the anvils or cone. The cone C serves as a centering-rest for saws of different sizes, and for saws having eyes differing in diameter; and it is around the axis of this cone that the saws are moved during the operation of setting their teeth on the anvil.

The machine herein described is not provided with a setting-plunger, as the teeth can be set by a hand-hammer; but I reserve the right to employ such a plunger, if desired.

For righting straight saws, the cone may be removed from the arm B; or adjusted down far enough to be out of the way.

Having described my invention, what I claim as new, and desire to secure by Letters Patent, is—

1. The combination of the adjustable rest D with its screw $e^2$, the adjustable rests G G, and the anvil-faces $b$ $b$, substantially as described.

2. The combination of the anvil A, cone C, and the auxiliary rests, the whole constructed and operating substantially as described.

THOMAS E. GRIMES.

Witnesses:
F. I. NORTON,
J. R. BARTLETT.